US008064300B2

(12) United States Patent
Abe et al.

(10) Patent No.: US 8,064,300 B2
(45) Date of Patent: Nov. 22, 2011

(54) OPTICAL DISK APPARATUS, SIGNAL PROCESSING SEMICONDUCTOR INTEGRATED CIRCUIT CONSTITUTING THE SAME, AND OPERATION METHOD (75) Inventors: Hiroshi Abe, Tokyo (JP); Takehiko Umeyama, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 862 days.

(21) Appl. No.: 12/064,510

(22) PCT Filed: Aug. 25, 2005

(86) PCT No.: PCT/JP2005/015389
§ 371 (c)(1),
(2), (4) Date: Feb. 22, 2008

(87) PCT Pub. No.: WO2007/023541
PCT Pub. Date: Mar. 1, 2007

(65) Prior Publication Data
US 2009/0147633 A1  Jun. 11, 2009

(51) Int. Cl.
*G11B 7/00* (2006.01)

(52) U.S. Cl. .................................. 369/44.35; 369/53.28

(58) Field of Classification Search .................. None
See application file for complete search history.

(56) References Cited

U.S. PATENT DOCUMENTS

2004/0252599 A1  12/2004 Sasaki et al.
2005/0063287 A1  3/2005 Suzuki et al.

FOREIGN PATENT DOCUMENTS

JP  2004-348843  12/2004
JP  2005-92999  4/2005

*Primary Examiner* — Paul Huber
(74) *Attorney, Agent, or Firm* — Mattingly & Malur, PC (57) ABSTRACT

In order to cancel an offset caused by a variation of a signal inputted from an optical pickup, variations of elements in an integrated circuit, etc., a calibration circuit which generates and feeds back an offset adjustment amount that makes the offset zero by a comparison with a reference value, and an offset adjustment circuit that makes the offset zero using the fed-back control signal are provided in an analog front-end LSI. The offset adjustment by the calibration circuit is automatically done in response to commands supplied from a digital signal processing LSI, a host control device, etc. On the other hand, as for a signal on which arithmetic processing such as gain control, addition and subtraction, is performed, the offset adjustment is performed by sending the offset adjustment amount obtained by an arithmetic operation performed by software processing of the digital signal processing LSI to the analog front-end.

7 Claims, 10 Drawing Sheets

OPTICAL DISK APPARATUS, SIGNAL PROCESSING SEMICONDUCTOR INTEGRATED CIRCUIT CONSTITUTING THE SAME, AND OPERATION METHOD

This application is a 371 of PCT/JP2005/015389, filed Aug. 25, 2005.

TECHNICAL FIELD

The present invention relates to a technique effective when applied to an offset adjustment at a semiconductor integrated circuit, and particularly to a technique effective when used in an offset adjustment of a circuit for processing a servo system signal at an analog front-end LSI (Large-Scale Integration) which processes a signal from an optical pickup in an optical disk apparatus.

BACKGROUND ART

An optical disk apparatus (hereinafter called DVD apparatus) that performs reproduction and recording of a DVD (Digital Versatile Disk) is generally provided with an analog front-end LSI which amplifies each of signals outputted from an optical pickup and thereafter takes a difference in signal strength therebetween, thereby obtaining a tracking error signal and a focus error signal of the disk. The DVD apparatus is also provided with a servo control circuit. The servo control circuit drives a motor and an actuator that move the optical pickup and a lens holder based on these error signals, to allow the optical pickup to follow each track of the optical disk and move, thereby performing control for applying a light beam to an accurate position.

In the analog front-end LSI which processes each signal inputted from the optical pickup, a differential amplifier which amplifies a servo system signal and an op amplifier which constitutes an arithmetic unit which performs arithmetic processing between the signals, have offsets due to a variation of the signal of the optical pickup, variations in the manufacture of each circuit, etc., thus causing a case where accurate servo control may not be performed. Since the characteristics differ depending on the type of pickup to be used and an unbalance occurs in each signal due to an assembly error, a balance adjustment circuit or the like for striking a balance between the signals is provided in a signal processor of a servo system. A system for generating the servo system signal needs to perform offset control such that the signal is brought to a desired level. Therefore, the analog front-end LSI is provided with an offset adjustment circuit.

Figure 10:
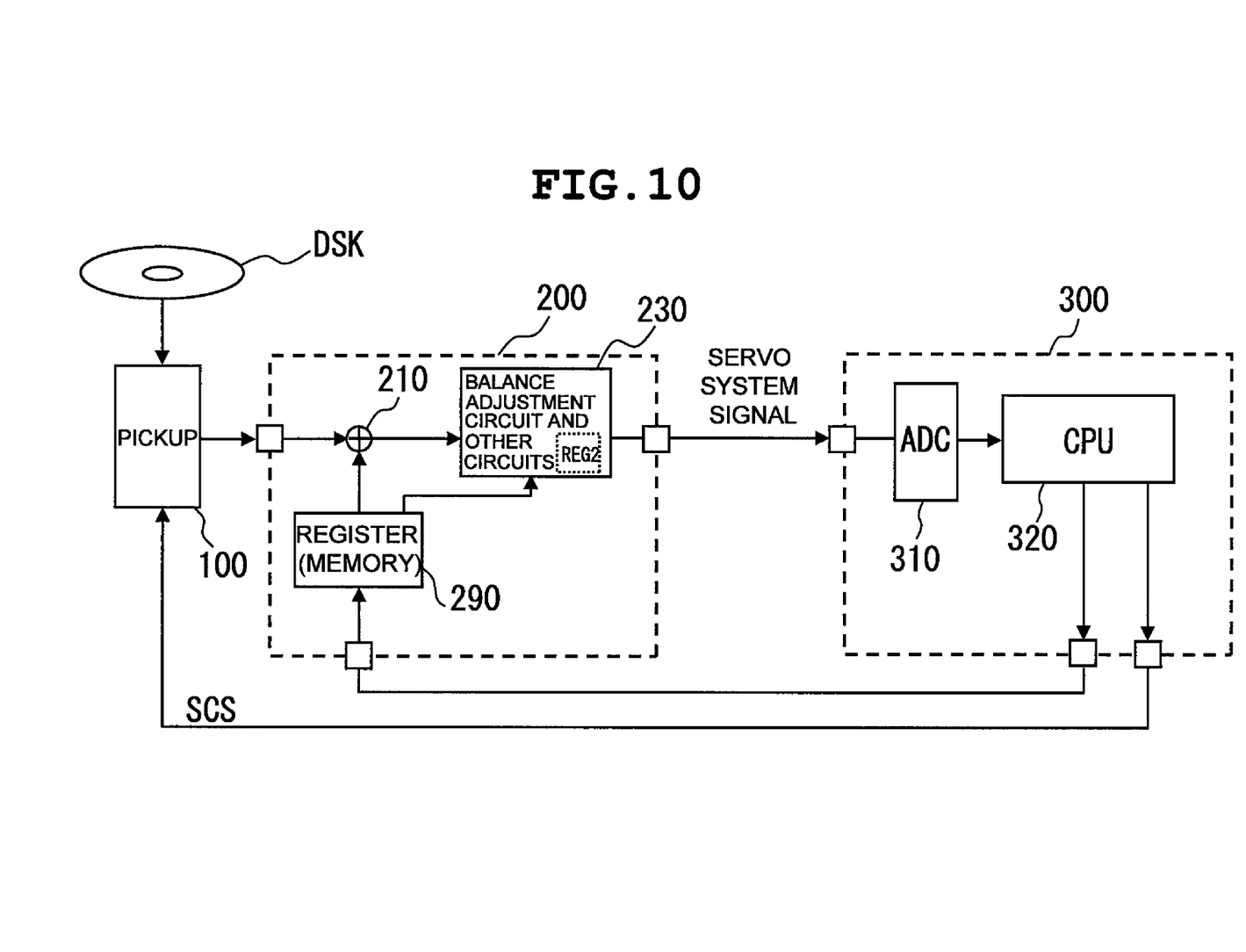
FIG. 10 is a block diagram illustrating an outline of a DVD apparatus to which an offset adjustment system discussed prior to the present invention is applied.

An outline of an offset adjustment system for a servo signal in a conventional analog front-end LSI is shown in FIG. 10. In a DVD apparatus to which the offset adjustment system of FIG. 10 is applied, an arithmetic unit 210 of the analog front-end LSI200 performs arithmetic processing on each signal inputted from an optical pickup 100. A balance adjustment circuit and other circuits 230 for performing other various signal processing perform signal processing such as a balance adjustment between the signals and other various signal processing, and outputs a servo system signal. Thereafter, an AD converter 310 of a digital signal processing LSI300 converts the signal to a digital signal, and an offset amount is calculated by software processing performed by a microcomputer (CPU) or the like operated in accordance with a program. Then, the digital signal processing LSI300 generates a control signal (adjusted value) such that a desired offset is reached, and supplies the same to the analog front-end LSI200, where the control signal is held in a register (or memory) 290, whereby the offset is adjusted. Incidentally, as the invention related to a DVD apparatus in which the signal from the optical pickup 100 is converted into a digital signal after having subjected to arithmetic processing, and an offset adjustment is performed by software processing, there is known the invention described in, for example, the following patent document 1.

Patent Document 1:
Japanese Patent Laid-Open No. 2004-348843

DISCLOSURE OF THE INVENTION

Problems that the Invention is to Solve

An optical pickup employed in a DVD apparatus is generally provided with four light-detecting devices which are disposed in the form of a cross-in square and detect main signals, and four light-detecting devices which detect sub signals respectively. Signals from such eight light-detecting devices are inputted to the corresponding analog front-end LSI (AFE), which takes the sum of these signals and differences between the signals thereby to generate a signal indicative of a focus error, a signal indicative of a tracking error, a tilt detection signal, etc., after which they are sent or passed to the corresponding digital signal processing LSI, from which a servo control signal SCS is generated.

Thus, a relatively large number of servo system signals exist in the analog front-end LSI employed in the DVD apparatus, and those signals are almost signals each of which needs an offset adjustment. Since the offset adjustments for such a number of signals are all performed by software processing of the digital signal processing LSI (DSP) in such an offset adjustment system as described above, a burden on the digital signal processing LSI increases and a system development period of the DVD apparatus, including the creation of software becomes relatively long. A problem arises in that since the digital signal processing LSI needs to obtain all target offset adjustment amounts within a time interval like an interval period during read and write operations by the calculation and set the same to the corresponding register or memory, burdens are imposed on other many data processing to be executed by the digital signal processing LSI.

An object of the present invention is to provide an offset adjustment technique capable of reducing a burden on a digital signal processing LSI for performing an offset adjustment of a servo system signal, at an analog front-end LSI which is used in a DVD apparatus and processes each signal outputted from an optical pickup.

Another object of the present invention is to provide an offset adjustment technique capable of shortening a system development period of a DVD apparatus having an analog front-end LSI that processes each signal outputted from an optical pickup.

The above and other objects and novel features of the present invention will become apparent from the description of the present specification and the accompanying drawings.

Means for Solving the Problems

Summaries of typical ones of the inventions disclosed in the present application will be explained in brief as follows:

The present invention has paid attention to the fact that as for offset adjustments necessary for an analog front-end LSI, there are known two types corresponding to cancellation of an offset produced due to a variation of a signal from an optical pickup and variations in the manufacture of each circuit, and offset control produced in each signal subjected to arithmetic processing such as gain control, addition and subtraction in a system for generating a servo system signal. They have been performed in discrete methods.

Described specifically, the cancellation of the offset produced due to the variation of the signal from the optical pickup and the variations in the manufacture of each circuit is performed by providing within an analog front-end LSI, a circuit that detects an offset by a comparison with a reference value, a calibration circuit that generates and feeds back such a control signal as to make the offset value zero with respect to a circuit targeted for an offset adjustment, and an offset adjustment circuit which generates a current or voltage corresponding to the fed-back control signal. The offset adjustment by the calibration circuit is automatically performed in response to commands issued from a host control device and the like. On the other hand, the offset control on the signal on which the arithmetic processing such as the gain control, addition and subtraction is performed such that, after the completion of the cancellation of the offset produced due to the variation of the signal from the optical pickup and the variations in the manufacture of the circuit, an offset adjustment amount obtained by the calculation performed by software processing of a digital signal processing LSI is sent to the analog front-end LSI, with respect to a circuit that receives an output from a circuit subjected to an adjustment to the offset produced due to the variation of the signal from the optical pickup and the variations in the manufacture of the circuit.

According to the above means, there is no need to perform all offset adjustments by the software processing of the digital signal processing LSI owing to the provision of the calibration circuit for canceling the offset in the analog front-end LSI. Therefore, a burden on the digital signal processing LSI is reduced and a system development period of a DVD apparatus including the creation of software is shortened.

The cancellation of the offset by the calibration circuit makes it possible to shorten the time required as compared with the software processing because AD conversion and complex operations are unnecessary. Consequently, the time required for the digital signal processing LSI to perform other processing can be taken long. On the other hand, the offset control on the signal on which the arithmetic processing such as the gain control, addition and subtraction is performed, needs to determine an offset adjustment amount in consideration of added gain. Therefore, when one attempts to implement it by hardware, a complex and large-scale circuit is required, thus causing a fear of an increase in chip size. However, the increase in chip size can be avoided by sending the offset adjustment amount obtained by the software processing of the digital signal processing LSI to the analog front-end LSI.

Effects of the Invention

Effects obtained by a typical one of the inventions disclosed in the present application will be explained in brief as follows:

According to the present invention, a burden on a digital signal processing LSI for an offset adjustment of a servo system signal can be lightened at an analog front-end LSI which is used in a DVD apparatus and processes each signal outputted from an optical pickup. Consequently, a system development period of the DVD apparatus having the analog front-end LSI can be shortened.

EXPLANATION OF REFERENCE NUMERALS 100 optical pickup
200 analog front-end LSI (semiconductor integrated circuit for signal processing)
210 arithmetic unit (adder-subtractor)
220 calibration circuit
230 balance adjustment circuit and other circuits for performing various signal processing
241 interface unit
242a, 242b sample-and-hold circuits
244a main system TE arithmetic circuit
244b main system FE arithmetic circuit
244c sub system TE arithmetic circuit
244d sub system FE arithmetic circuit
245a subtractor
245b, 245c summers
261a-261d, 262a-262c offset adjustment circuits
300 digital processing LSI
310 AD converter
320 central processing unit (CPU)

BEST MODE FOR CARRYING OUT THE INVENTION

Preferred embodiments of the present invention will hereinafter be described with reference to the accompanying drawings.

Figure 1:
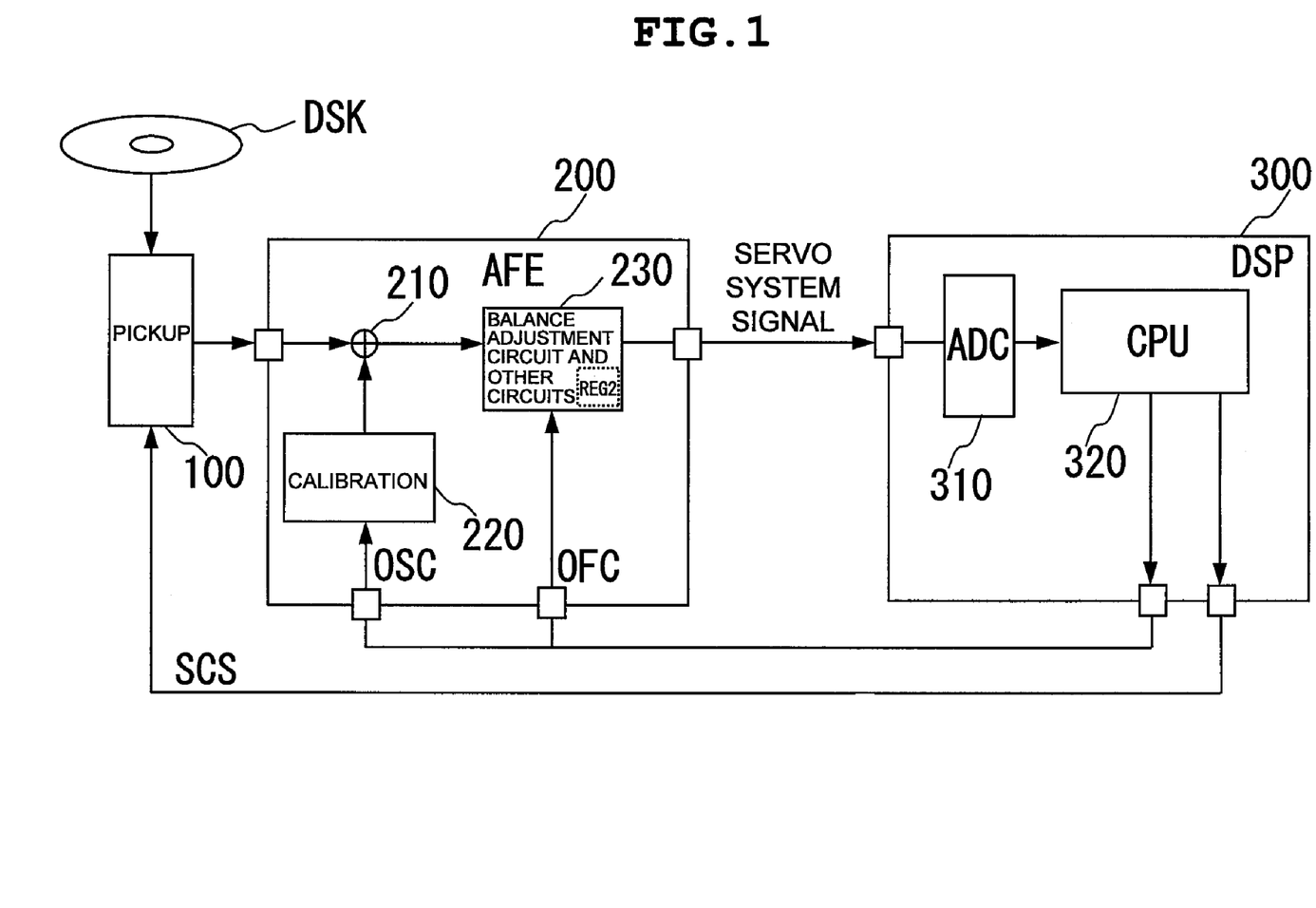
FIG. 1 is a block diagram showing an outline of a first embodiment of a DVD apparatus to which an offset adjustment system according to the present invention is applied.

FIG. 1 shows an outline of a DVD apparatus to which an offset adjustment system according to the present invention is applied.

In FIG. 1, reference numeral 100 indicates an optical pickup which applies laser light to an optical disk DSK having recorded various information therein to detect reflected light and which converts it into an electric signal and outputs the same therefrom. Reference numeral 200 indicates an analog front-end LSI (AFE) which amplifies each signal inputted from the optical pickup 100 and makes a difference in signal strength to produce or generate a tracking error signal, a focus error signal or the like. Reference numeral 300 indicates a digital signal processing LSI (DSP) which AD-converts a signal outputted from the analog front-end LSI200 and performs processing such as demodulation of data, an error correction, decode (elongation), generation of a servo control signal, etc.

In the present embodiment, a calibration circuit 220 including: a circuit which detects an offset and feeds back it; and a DA converter which generates such a current or voltage as to cancel the offset in accordance with the detected and fed-back offset adjustment amount, etc. is provided corresponding to an adder-subtractor 210 or the like which processes a servo system signal in the analog front-end LSI200. The calibration circuit 220 is provided with a sequencer that controls the circuit for detecting the offset and the DA converter in a predetermined order to determine an offset adjustment value. The sequencer starts operating in response to an offset adjustment start command OSC issued from the digital signal processing LSI300. The analog front-end LSI200 includes a balance adjustment circuit that performs a balance adjustment in such a manner that an unbalance between the signals processed at the adder-subtractor 210 is reduced and circuit 230 for performing other various signal processing.

The digital signal processing LSI300 is provided with an AD converter 310 that converts an analog signal outputted from the analog front-end LSI200 into a digital signal, a central processing unit (CPU) 320 which performs various arithmetic processing, etc. The digital signal processing LSI300 performs arithmetic processing, based on a servo system signal and a target value supplied from the analog front-end LSI200 and generates and outputs a servo control signal SCS corresponding to each of a tracking motor, a focus actuator and the like provided in the optical pickup 100.

In the present embodiment, an offset adjustment circuit and a register are provided corresponding to the balance adjustment circuit and other circuits 230. An offset control value OFC set to the register (memory) is generated by executing software processing of the digital signal processing LSI300, i.e., causing the CPU 320 to execute a program stored in the memory. The software processing of the digital signal processing LSI300 and a specific offset adjustment made by the calibration circuit 220 will be explained in detail later. Although not shown in the drawing, the memory that stores therein the program to be executed by the CPU 320 may be provided as an external memory. The program may be stored in a memory provided in the digital signal processing LSI300. The analog front-end LSI200 and the digital signal processing LSI300 can be configured as one module by being mounted to a package such as ceramic.

Figure 2:
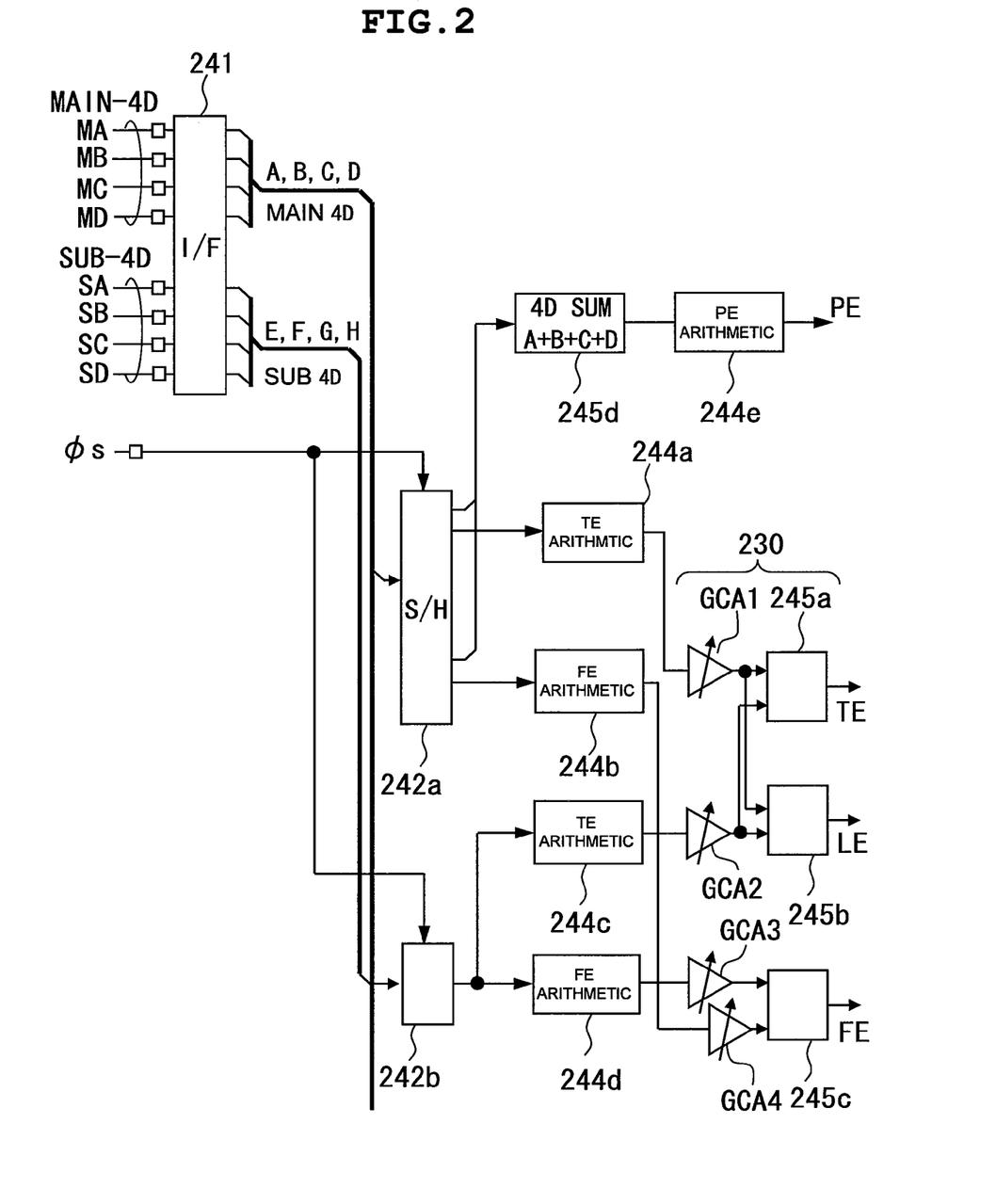
FIG. 2 is a block diagram showing a schematic configuration of a circuit section to be processed to servo-control a signal inputted from an optical pickup, of internal circuits in an analog front-end LSI (AFE) that constitutes the DVD apparatus.

A schematic configuration of a circuit section in internal circuits of the analog front-end LSI200, which processes the signals inputted from the optical pickup 100 for servo control, is shown in FIG. 2. Further, four main signals MA through MD and four sub signals SA through SD of the signals inputted from the optical pickup 100 are shown in FIG. 2.

The optical pickup is provided with a main sensor comprising four light-detecting devices which are disposed in the form of a cross-in square and detect reflected light of a main beam, and two pairs of sub sensors respectively comprising two light-detecting devices which detect reflected light of two sub beams. Signals outputted from the main sensor of these are called main signals MA through MD, and signals outputted from the sub sensors are called sub signals SA through SD.

The main signals MA through MD and the sub signals SA through SD are supplied to their corresponding sample-and-hold circuits 242a and 242b via a signal interface unit 241. The main signals MA through MD are sampled to the sample-and-hold circuit 242a, and the sub signals SA through SD are sampled to the sample-and-hold circuit 242b, respectively. The timing provided to perform sampling is given by a sampling clock $\phi s$ supplied from the digital signal processing LSI300.

The four main signals MA through MD sampled to the sample-and-hold circuit 242a are supplied to a TE arithmetic circuit 244a and an FE arithmetic circuit 244b. The sub signals SA through SD sampled to the sample-and-hold circuit 242b are supplied as they are, to an FE arithmetic circuit 244d of a sub system. Further, the sub signals SA through SD are supplied to a TE arithmetic circuit 244c of the sub system.

Assuming now that the values of the main signals MA, MB, MC and MD are A, B, C and D, and the values of the sub signals SA, SB, SC and SD are E, F, G and H, respectively, the TE arithmetic circuit 244a performs a computation of (A+D)−(B+C), based on the inputted main signals MA through MD and outputs the result thereof. The FE arithmetic circuit 244b performs a computation of (A+C)−(B+D), based on the inputted main signals MA through MD and outputs the result thereof. The TE arithmetic circuit 244c of the sub system performs a computation of (E+H)−(F+G), based on the inputted sub signals SA through SD and outputs the result thereof. The FE arithmetic circuit 244d of the sub system performs a computation of (E+G)−(F+H), based on the inputted sub signals SA through SD and outputs the result thereof.

Of the computed results of these arithmetic circuits 244a through 244d, the computed results of the arithmetic circuits 244a and 244c are supplied to a subtractor 245a via programmable gain amplifiers GAC1 and GAC2, where a difference therebetween is computed, followed by being outputted as a tracking error signal TE. The computed results of the arithmetic circuits 244a and 244c are supplied via the programmable gain amplifiers GAC1 and GAC2 to a summer 245a, where they are added together, after which the result of summing is outputted as a lens error signal LE. Further, the computed results of the arithmetic circuits 244b and 244d are supplied via programmable gain amplifiers GAC3 and GAC4 to a summer 245c, where they are added together, after which the result of summing is outputted as a focus error signal FE.

The tracking error signal TE, the lens error signal LE and the focus error signal FE can respectively be determined by, for example, equations: TE=(A+D)−(B+C)−K{(E+H)−(F+G)}, LE=(A+D)−(B+C)+K{(E+H)−(F+G)}, and FE=(A+C)−(B+D)+K{(E+G)−(F+H)}. Incidentally, since the generation of the various error signals by these computations is similar to the method which has heretofore been executed, its detailed description is omitted.

The analog front-end LSI200 of the present embodiment is provided with a summer 245d and a PE arithmetic circuit 244e, which add together the main signals MA through MD sampled in the sample-and-hold circuit 242a and performs a predetermined arithmetic operation on the result of addition to generate a pull-in error signal PE, respectively. Even in addition to the above, although not shown in the drawing, there is provided an arithmetic circuit which generates a detected signal indicative of, for example, a wobble or a tilt of a disk, based on each signal inputted from the optical pickup 100 and outputs the same.

Figure 3:
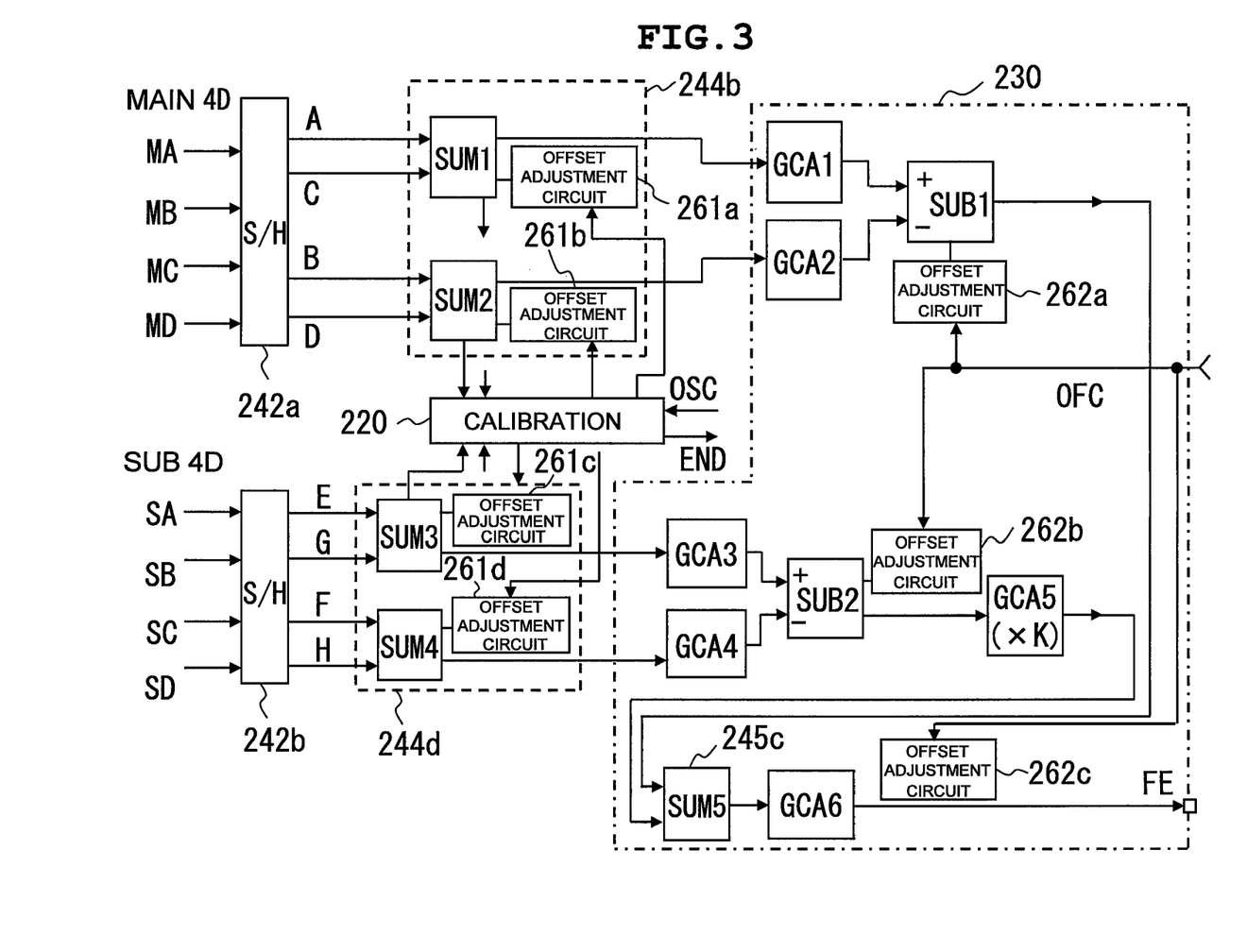
FIG. 3 is a block diagram showing a more detailed configuration example of a circuit section that generates a focus error signal FE in the analog front-end LSI.

A more detailed configuration example of a circuit section which generates the focus error signal FE of the various detected signals, is shown in FIG. 3. In FIG. 3, the same reference numerals are attached to the same circuit blocks as those shown in FIG. 2, and their dual explanations are omitted.

As shown in detail in FIG. 3, an FE arithmetic circuit 244b on the main side includes a summer SUM1 which adds together main signals MA and MC, and a summer SUM2 which adds together main signals MB and MD. A programmable gain amplifier GAC1 which amplifies an output (A+C) of the summer SUM1, a programmable gain amplifier GAC2 which amplifies an output (B+D) of the summer SUM2, and a subtractor SUB1 which takes a difference between the outputs of the programmable gain amplifiers GAC1 and GAC2, are provided in a stage subsequent to the FE arithmetic circuit 244b.

On the other hand, an FE arithmetic circuit 244d on the sub side includes a summer SUM3 which adds together sub signals SA and SC, and a summer SUM4 which adds together sub signals SB and SD. A programmable gain amplifier GAC3 which amplifies an output (E+G) of the summer SUM3, a programmable gain amplifier GAC4 which amplifies an output (F+H) of the summer SUM4, a subtractor SUB2 which takes a difference between the outputs of the programmable gain amplifiers GAC3 and GAC4, and a programmable gain amplifier GAC5 which multiplies the output of the subtractor SUB2 by K, are provided in a stage subsequent to the FE arithmetic circuit 244d.

A summer SUM5 which adds together the output of the subtractor SUB1 and the output of the programmable gain amplifier GAC5, and a programmable gain amplifier GAC6 which amplifies an output produced from the summer SUM5, are provided in a stage subsequent to these circuits.

Thus, a focus error signal FE expressed in FE=(A+C)−(B+D)+K{(E+G)−(F+H)} is outputted.

In the present embodiment, offset adjustment circuits 261a and 261b are provided associated with the summers SUM1 and SUM2 respectively, and offset adjustment circuits 261c and 261d are provided associated with the summers SUM3 and SUM4 respectively. An offset adjustment circuit 262a is provided associated with the subtractor SUB1, and an offset adjustment circuit 262b is provided associated with the subtractor SUB2. Further, an offset adjustment circuit 262c is provided associated with a summer SUM5.

The offset adjustment circuits 261a through 261d are configured so as to be controllable by a common calibration circuit 220. When the calibration circuit 220 receives an offset adjustment start command OSC from the digital signal processing LSI300 shown in FIG. 1, the calibration circuit 220 starts a calibration operation. On the other hand, each of the offset adjustment circuits 262a through 262c is configured in such a manner that an offset is directly controlled by an offset control signal OFC supplied from the digital signal processing LSI300.

Figure 4:
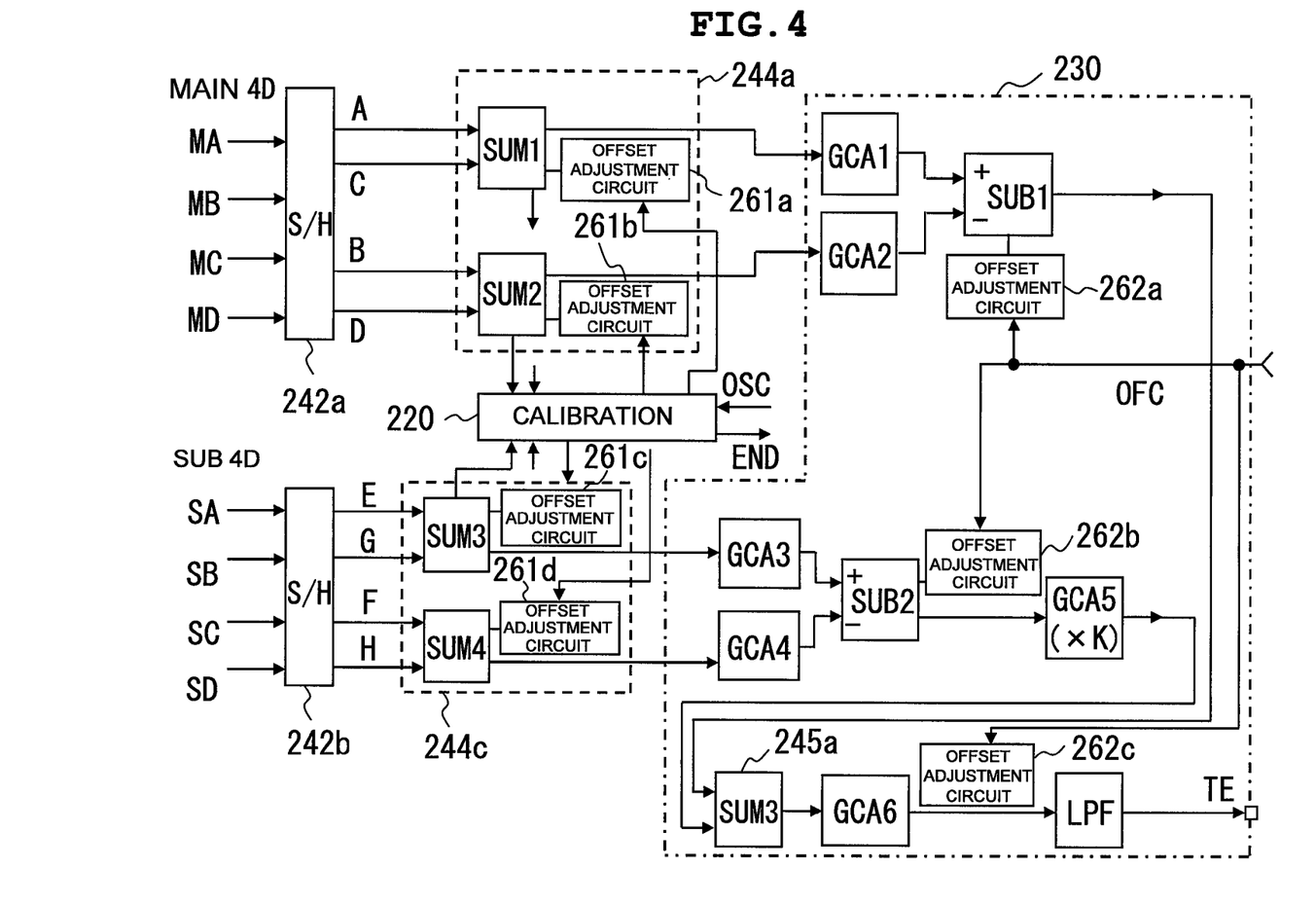
FIG. 4 is a block diagram illustrating a more detailed configuration example of a circuit section that generates a tracking error signal TE in the analog front-end LSI.

FIG. 4 shows a configuration of TE arithmetic circuits 244a and 244c and a balance adjustment circuit and other circuits 230 provided in a stage subsequent thereto. As is understood from a comparison between FIGS. 4 and 3, each of the TE arithmetic circuits 244a and 244c has a configuration similar to each of the FE arithmetic circuits 244b an 244d and is added with an offset adjustment function similar to the above. The differences between the circuits shown in FIGS. 4 and 3 reside in that, for example, the inputs of summers SUM1 through SUM4 are different, an arithmetic unit located in a stage subsequent to the balance adjustment circuit and other circuits 230 is of the summer in the circuit of FIG. 3 but of a subtractor in the circuit of FIG. 4, and a low-pass filter LPF is provided in a stage subsequent to the subtractor SUB3. A tracking error signal TE expressed in TE=(A+D)−(B+C)−K{(E+H)−(F+G)} is outputted from the circuit.

Figure 5:
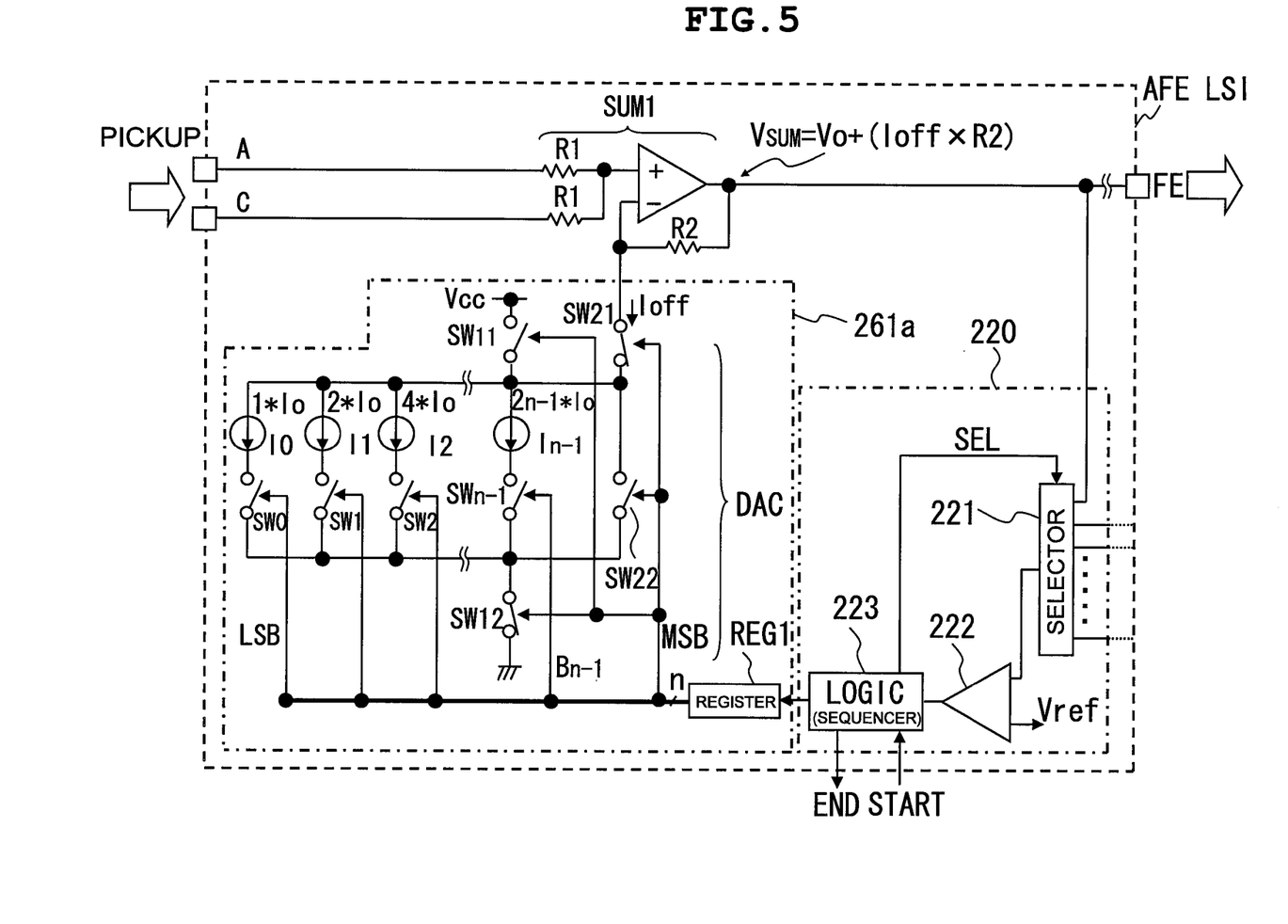
FIG. 5 is a circuit diagram depicting a specific circuit configuration example illustrative of a calibration circuit and an offset adjustment circuit employed in the embodiment.

A specific circuit configuration example illustrative of the above-described calibration circuit 220 and offset adjustment circuit 261a is shown in FIG. 5. Since the offset adjustment circuits 261b through 261d and 262a through 262c are similar to the offset adjustment circuit 261a in configuration, their diagrammatic illustrations are omitted.

The calibration circuit 220 comprises a selector 221 which selects a target signal (any output of summers SUM1 through SUM4 in FIG. 3), a comparator 222 which compares the signal selected by the selector 221 and a reference voltage Vref, a sequencer 223, etc.

The sequencer 223 can be constituted of a random logic circuit or the like. When the sequencer 223 receives an offset adjustment start command OSC from the digital signal processing LSI300, it starts a calibration operation. When all is ended, the sequencer 223 returns an end signal END. Described specifically, the sequencer 223 generates a selection control signal SEL for the selector 221 to supply the outputs of the summers SUM1 through SUM4 to the comparator 222 sequentially and generates and outputs n-bit codes set to the offset adjustment circuit 261a according to the output of the comparator 222.

The offset adjustment circuit 261a comprises a register REG1 which retains or holds the n-bit codes set by the sequencer 223, and a DA converter DAC which outputs currents corresponding to the set codes of the register REG1. A collection of the register REG1 and the like associated with each of the offset adjustment circuits 261a through 261d may be provided as a memory.

The DA converter DAC has n current sources $I0$, $I1$, $I2$, ... $In-1$ to which weights of the nth power of two are assigned, and switches SW0, SW1, SW2, ... SWn−1 respectively coupled in series to the current sources. The DA converter DAC also includes a switch SW11 provided between the current sources $10$ through $In-1$ and a source voltage terminal Vcc, a switch SW12 provided between the switches SW0 through SWn−1 and a ground point, a switch SW21 provided between the current sources and an inversion input terminal of an op amplifier that constitutes the summer SUM1, and a switch SW22 provided in parallel with the switches SW0 through SWn−1.

Of the above switches, the switches SW11 and SW12, and SW21 and SW22 are respectively complementarily controlled by the most significant bit MSB of the set codes of the register REG1, that is, they are controlled in such a manner that when ones of the respective switches are turned ON, the others thereof are turned OFF. The switches SW11 and SW21, and SW12 and SW22 are respectively complementarily controlled by the most significant bit MSB of the set codes of the register REG1.

Thus, when the most significant bit MSB is "1", the switches SW12 and SW21 are respectively brought to an ON state, and the switches SW11 and SW22 are respectively brought to an OFF state, so that a combined current Ioff of the current sources $10$ through $In-1$ corresponding to the states of the switches SW0 through SWn−1 is pulled out from the summer SUM1. On the other hand, when the most significant bit MSB is "0", the switches SW12 and SW21 are respectively brought to an OFF state, and the switches SW11 and SW22 are respectively brought to an ON state, so that a combined current Ioff of the current sources $10$ through $In-1$ corresponding to the states of the switches SW0 through SWn−1 is caused to flow into the summer SUM1. The current Ioff that has flowed into the summer SUM1 is caused to flow through a feedback resistor R2, whereby the potential of the inversion input terminal of the op amplifier is changed by a voltage change developed by the resistor.

The switches SW0 through SWn−1 are respectively brought to an ON or OFF state according to the set codes LSB through LSBn−1 of the register REG1. Thus, a combined current Ioff having a magnitude obtained by adding currents of the current sources arranged in series with the turned-ON switches, of the current sources I0 through In−1 is provided as an output current of the DA converter DAC.

Incidentally, the calibration circuit 220 is used in common between the offset adjustment circuits 261b through 261d as shown in FIGS. 3 and 4. The offset control value OFC shown in FIG. 1 is inputted to the register REG1 thereby to allow each of the offset adjustment circuits 262a through 262c to perform an offset adjustment.

A procedure of an offset adjustment operation of the summer SUM1 will next be explained.

Figure 6:
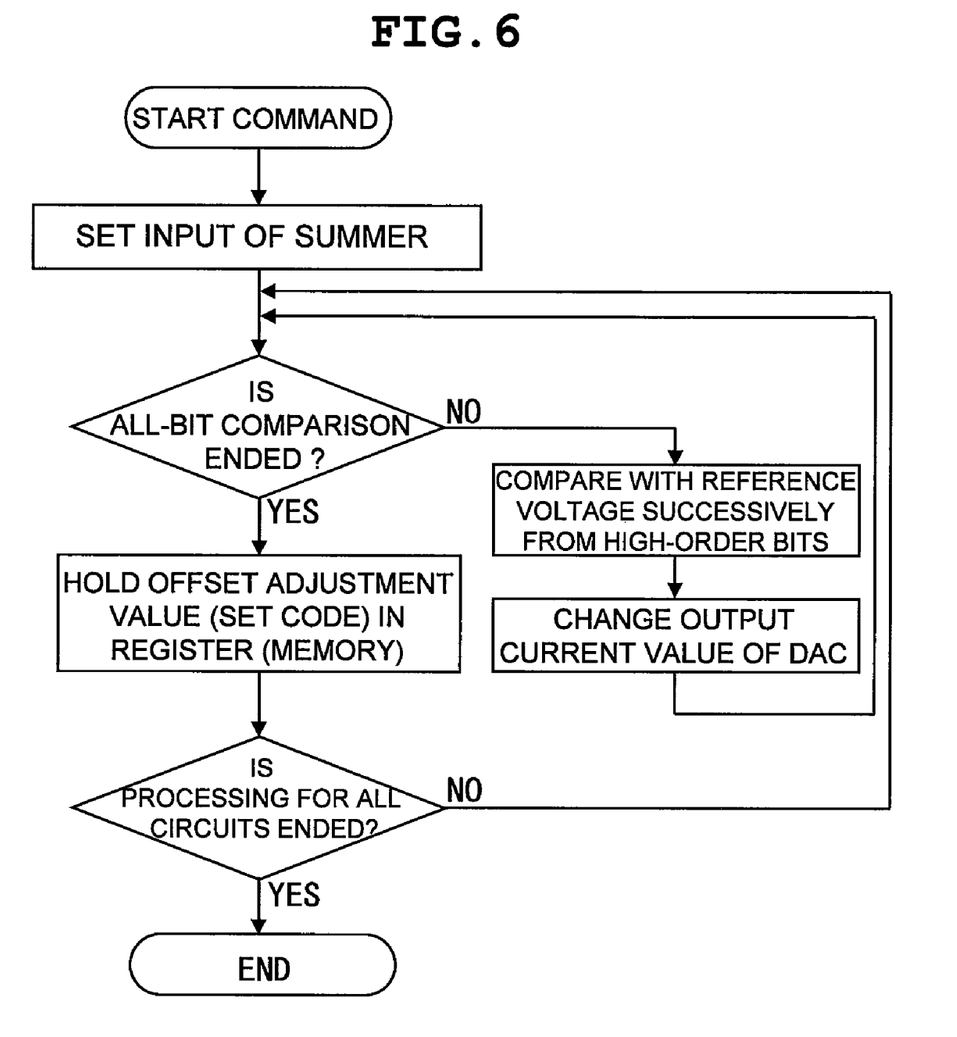
FIG. 6 is a flowchart showing a procedure of an offset adjustment of an arithmetic unit that processes a servo system signal by the calibration circuit (hardware)

When the sequencer 223 receives an offset adjustment start command OSC therein, it starts a calibration operation and executes an offset adjustment in accordance with such a procedure as shown in FIG. 6.

Described specifically, a predetermined voltage is first applied from nodes A and C shown in FIG. 5 to a non-inversion input terminal of the op amplifier of the summer SUM1. Then, the switches SW0 through SWn−1 are all turned OFF and the combined current Ioff is brought to "0". The sequencer 223 causes the comparator 222 to determine whether the output of the summer SUM1 at that time is higher than the reference voltage Vref. The sequencer 223 makes a decision as to whether the most significant bit MSB of the set codes of the register REG1 should be set to "1" or "0" according to the result of determination, and sets the result of decision to the register.

Subsequently, the sequence 223 turns ON the switch SWn−1 to bring the combined current Ioff to $2^{n-1} \times I0$ and causes the comparator 222 to determine whether the output of the summer SUM1 at that time is higher than the reference voltage Vref. The sequencer 223 makes a decision as to whether the corresponding bit Bn−1 of the set codes of the register REG1 should be set to "1" or "0" according to the result of determination. Thus, the values of the respective bits are decided in order from the bit Bn−1 on the high-order side of the register REG1 to the LSB by a successive approximation.

As a result, the summer SUM1 is finally set as small in offset as possible. When the setting of all bits is terminated, the sequencer 223 generates a signal for switching the selector 221 and executes an offset adjustment to the following summer SUM2 in accordance with a procedure similar to the above. Thereafter, the sequencer 223 performs an offset adjustment to each of the summers SUM3 and SUM4. Thus, the offset adjustments of the summers provided in the FE arithmetic circuits 244b and 244d are completed. Subsequently, the sequencer 223 performs offset adjustments of the summers provided in the TE arithmetic circuits 244a and 244c. When the offset adjustments of all summers with the present system applied thereto, lying in the analog front-end LSI200 are ended in this way, the sequencer 223 outputs an end signal END to the digital signal processing LSI300.

Figure 7:
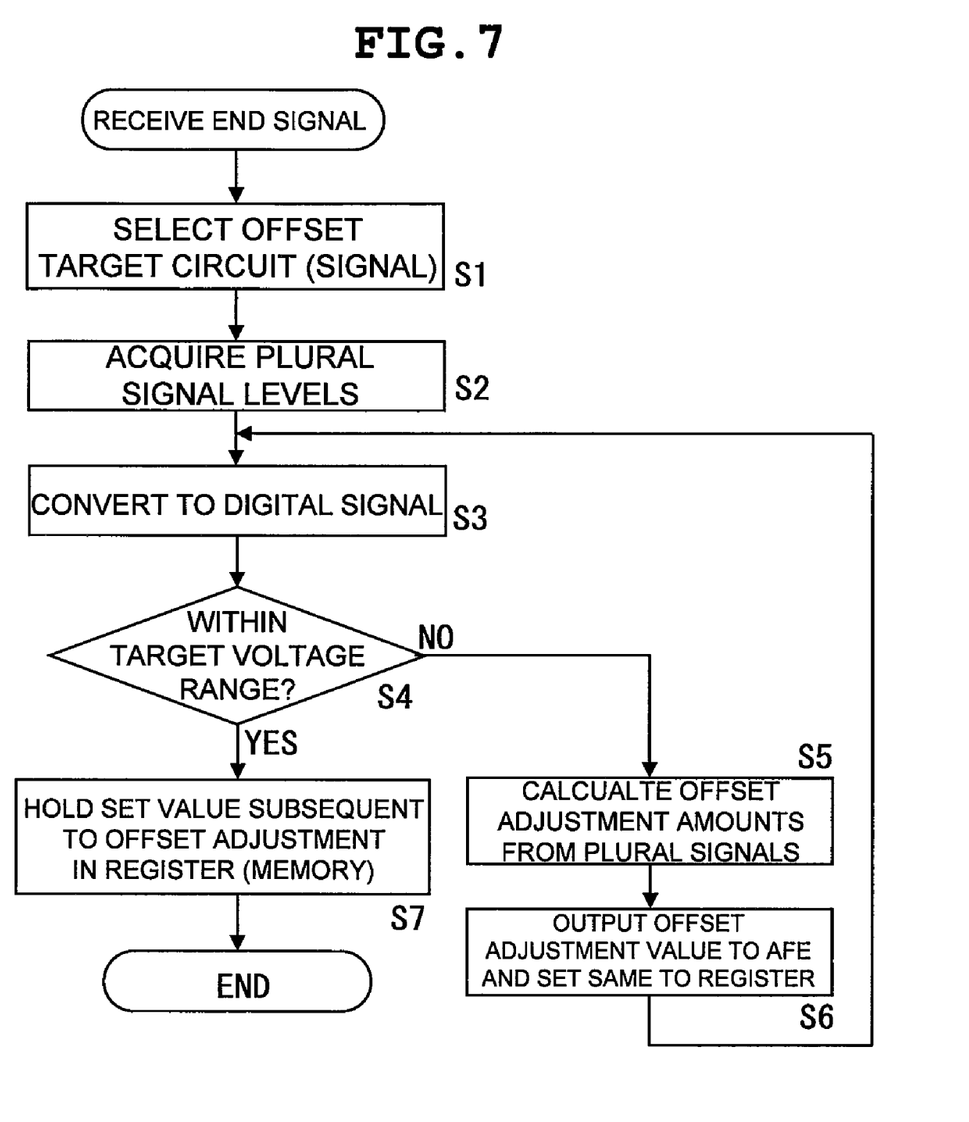
FIG. 7 is a flowchart showing a procedure of offset control of a balance adjustment circuit and other circuits for the servo system signal by software processing of a digital signal processing LSI (DSP)

When the digital signal processing LSI300 receives the end signal END from the analog front-end LSI200, it starts offset control on the balance adjustment circuit and other circuits 230 for performing various signal processing, lying in a stage subsequent to the summers SUM1 through SUM4 by software processing in accordance with a flowchart shown in FIG. 7.

When the offset control shown in FIG. 7 is started, a circuit (signal) taken as a control target is first selected (Step S1). A plurality of signal levels are acquired while the gain of the circuit is being changed (Step S2). Next, each of the acquired signals is converted into a digital signal by the AD converter 310 (Step S3). It is determined whether the converted signal falls within a target voltage range (Step S4). When it is found not to fall within the target voltage range, such offset adjustment amounts that the signals obtained at Step S2 can fall within the target voltage range are determined by calculation from those signals. Then, the offset adjustment amounts are supplied to the offset adjustment circuits (262a through 262c) corresponding to the target circuits respectively (Steps S5 and S6).

Then, the software processing returns to Step S3, where a signal inputted at that time is AD-converted and a decision is made as to whether it coincides with a target voltage again. When the target signal falls within the target voltage range by repeating this processing, the software processing proceeds to Step S7, where an offset adjustment amount OFC at that time is held or retained in the corresponding register (or memory) corresponding to the target circuit, after which the offset adjustment performed by the software processing is terminated (Step S7). Incidentally, the offset adjustment performed by the software processing of FIG. 7 is not directed to such one that the offset is set as small as possible, unlike the offset adjustment based on the hardware shown in FIG. 5. This aims to control the offset such that it coincides with a target value.

In the present embodiment as described above, the calibration circuit for canceling the offset is provided in the analog front-end LSI. Thus, it is not necessary to perform all the offset adjustments by the software processing of the digital signal processing LSI. Therefore, a burden on the digital signal processing LSI is reduced and the period required to develop a system for a DVD apparatus inclusive of the creation of software is shortened. An advantageous effect is brought about in that the cancellation of the offset by the calibration circuit makes it possible to shorten the time required as compared with the software processing because AD conversion and complex operations are unnecessary. The summers SUM1 through SUM4 offset-adjusted by the offset adjustment circuits 261b through 261d are provided in the stages prior to the subtractors SUB1 through SUB3 offset-adjusted by the offset adjustment circuits 262a through 262c, and the signals having passed through the summers SUM1 through SUM4 are received by the subtractors SUB1 through SUB3. Therefore, the software operations for the offset adjustment circuits 262a through 262c may take less consideration to variations in offset produced due to variations of the signals from the optical pickup and variations in the manufacture of the circuits. It is thus possible to shorten the period required to develop software.

Figure 8:
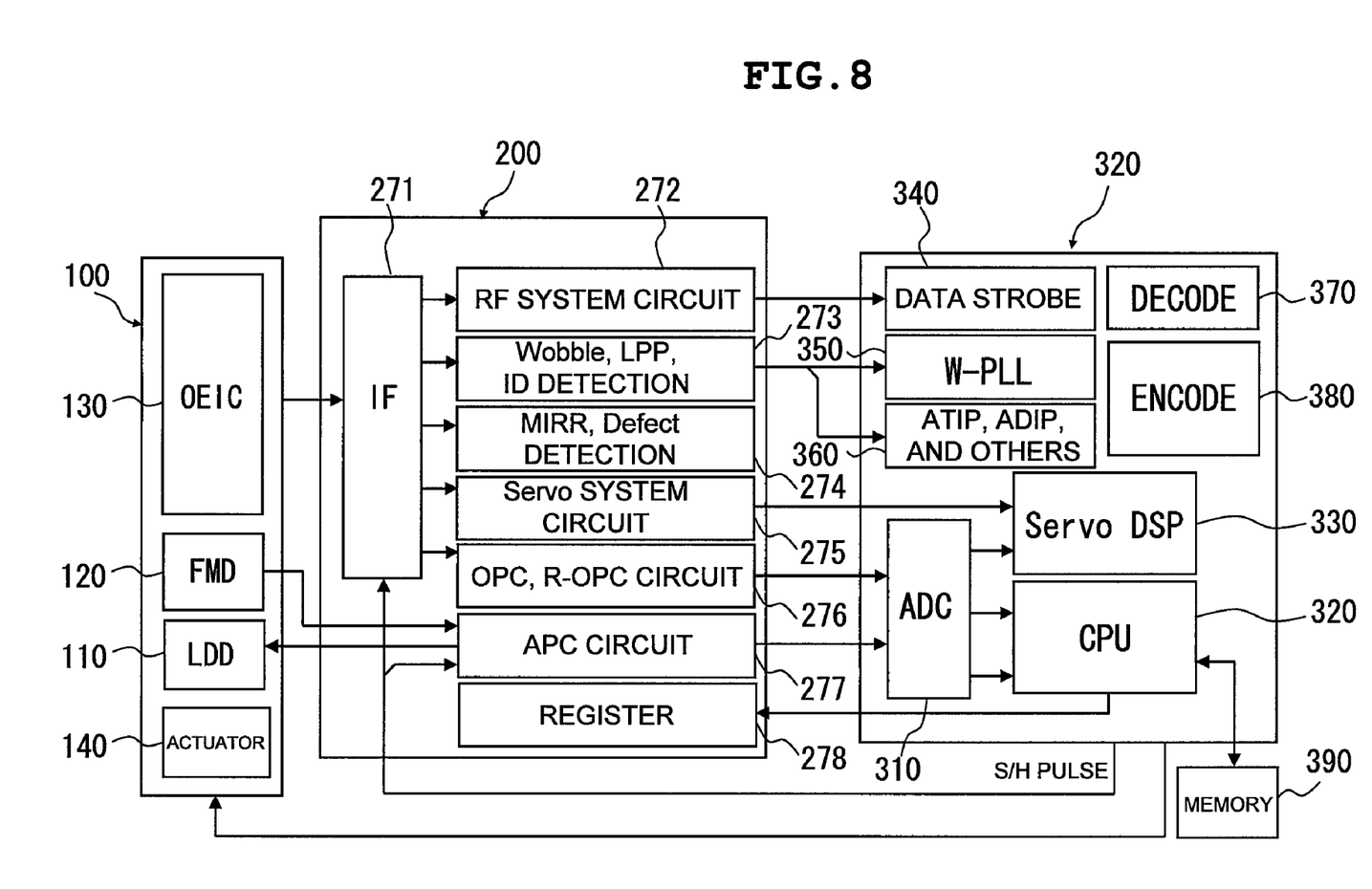
FIG. 8 is a block diagram illustrating a configuration example of an analog front-end LSI that is used in a DVD apparatus and processes a signal from an optical pickup, as one example of a semiconductor integrated circuit suitable when the present invention is applied thereto.
Figure 9:
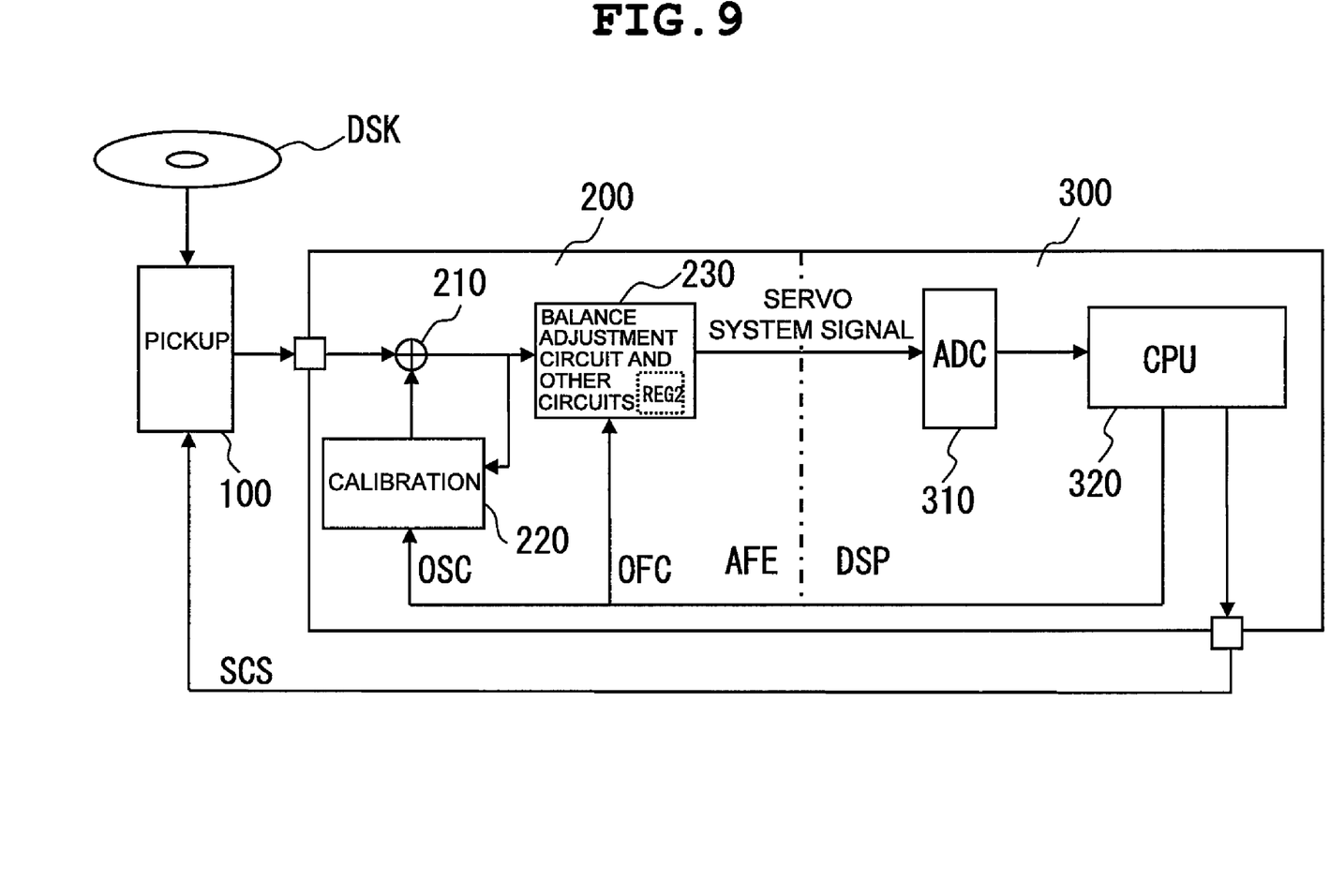
FIG. 9 is a block diagram showing an outline of a second embodiment of a DVD apparatus to which an offset adjustment system according to the present invention is applied.

A configuration example illustrative of an analog front-end LSI for processing signals inputted from an optical pickup, and a DVD apparatus using it is shown in FIG. 8 as one example of a semiconductor integrated circuit suitable when the present invention is applied thereto.

The analog front-end LSI (hereinafter abbreviated as AFE) 200 includes an interface circuit 271 having a level shift circuit for converting signals inputted from an optoelectric converter or transducer of the optical pickup 100 into signals of levels suitable for circuits provided inside the LSI, etc. The AFE200 includes: an RF-system circuit 272 which performs processing such as extraction of an envelope from a highfrequency reproduction or playback signal inputted from the pickup; a first detection circuit 273 which detects wobbles in the pickup, an LPP (Land Pre-Pit), an ID region, etc.; and a second detection circuit 274 which detects MIRR, Defects, etc. Address information recorded in each land part between grooves is included in an LPP portion.

MIRR detection performed by the second detection circuit 274 is processing for providing a suitable threshold level between the top and bottom of the envelop of the playback signal for the purpose of track access and detecting ripples at the time that the pickup crosses tracks. Defect detection performed by the second detection circuit 274 is processing for detecting that the top level of reflected light is brought down due to blemishes and flaws on the surface of a disk, and for making a decision as to the presence or absence of the defects.

Further, the AFE200 includes: a servo system circuit 275 which processes each signal inputted from the pickup to perform alignment in a focus direction, a tracking direction and the like; an OPC circuit 276 which performs a signal extraction for verifying record quality; an automatic power control circuit 277 which controls the output of each light-emitting device; and a register 278 which retains or holds each set value sent from a digital signal processing LSI300 used as a host control device.

The optical pickup 100 includes an LD driver 110 which drives the light-emitting device for applying laser light to an optical disk, and a front monitor detector 120 which detects the intensity of emitted light to make the amount of light of the light-emitting device constant. The optical pickup 100 includes an optoelectronic converting IC130 which converts light reflected from the optical disk into an electric signal and amplifies the same, an actuator 140 which performs alignment in the focus direction, tracking direction and the like, etc.

The digital signal processing LSI300 has an AD converter 310 which AD-converts each signal inputted from the AFE200, a central processing unit (CPU) 320 which performs control or the like of the entire system in accordance with a program, and a DSP 330 which performs digital computation processing for performing lens alignment, based on a servo system signal inputted from the analog front-end LSI200. The digital signal processing LSI300 includes a data strobe circuit 340 comprising a PLL circuit which generates a read clock for read synchronization from a playback signal, and a W-PLL circuit 350 which generates a write clock necessary upon recording into the disk.

Further, the digital signal processing LSI300 generates address information and absolute position information represented by wobble phase modulation, based on a wobble detection signal. The digital signal processing LSI300 also includes ATIP, ADIP processor and others 360, a decoder 370 which performs decoding of read data, an error correction, decode (elongation), etc., and an encode unit 380 which performs encoding (compression) of write data. The program to be executed by the CPU 320 has been stored in an external memory 390. However, a built-in memory is provided and may be configured so as to store the program therein.

While the invention made above by the present inventors has been described specifically on the basis of the preferred embodiments, the present invention is not limited to the embodiments referred to above. It is needless to say that various changes can be made thereto within the scope not departing from the gist thereof. Although, for example, the above embodiment has explained the analog front-end LSI (AFE) 200 and the digital signal processing LSI300 respectively applied to the semiconductor integrated circuits on the discrete semiconductor chips, they can be configured on one semiconductor chip as one semiconductor integrated circuit.

Although the above embodiment has explained where the LSI which performs the digital computation processing for performing lens alignment, based on the servo system signal inputted from the AFE200, and the host control device which gives the command to the calibration circuit of the AFE200 are configured as the same LSI, they may be configured as discrete LSIs respectively.

INDUSTRIAL APPLICABILITY

While the above description has principally been made of one in which the invention made by the present inventors is applied to the analog front-end LSI of the DVD apparatus which belongs to the field of application reaching the background of the invention, the present invention is not limited to it, but can generally be used in an analog front-end LSI of an optical disk apparatus with an optical disk as a media, such as a CD (Compact Disk) drive device.

What is claimed is:
1. A semiconductor integrated circuit comprising:
a servo control circuit which generates a servo control signal using a signal inputted from an optical pickup,
wherein the servo control circuit includes an analog circuit which carries out analog signal processing of the signal inputted from the optical pickup and a digital circuit which carries out digital processing of an analog signal generated from the analog circuit,
wherein the digital circuit includes an AD converter which converts the analog signal into a digital signal and a digital signal processing circuit which carries out digital signal processing of the digital signal,
wherein the analog circuit includes a calibration circuit, a first offset adjustment circuit and a second offset adjustment circuit for carrying out an offset adjustment of the analog signal,
wherein the calibration circuit generates a multi-bit code control signal by comparing a signal to be adjusted by the first offset adjustment circuit with a predetermined reference voltage,
wherein the first offset adjustment circuit includes a DA converter which converts the multi-bit code control signal generated by the calibration circuit into an analog output signal which determines an offset adjustment value of the first offset adjustment circuit, and
wherein an offset adjustment value of the second offset adjustment circuit is determined by an offset control signal which is generated from the digital signal processing by the digital signal processing circuit of the digital signal converted by the AD converter.
2. The semiconductor integrated circuit according to claim 1,
wherein the digital signal processing circuit generates the servo control signal, and the servo control signal is adapted to be supplied to the optical pickup.
3. The semiconductor integrated circuit according to claim 1,
wherein the first offset adjustment circuit carries out adjustment of an offset due to variations of an amplifier and an element used in the analog circuit.
4. The semiconductor integrated circuit according to claim 1,
wherein the first offset adjustment circuit includes a plurality of adjustment circuits corresponding to a plurality of amplifiers used in the analog circuit, and wherein the calibration circuit controls the plurality of adjustment circuits.

5. The semiconductor integrated circuit according to claim 1,
wherein the digital signal processing circuit of the digital circuit operates in accordance with a program stored in a memory so that the digital signal processing circuit generates the offset control signal.

6. The semiconductor integrated circuit according to claim 4,
wherein the calibration circuit includes a sequencer which carries out sequentially a plurality of offset adjustment operations of the plurality of adjustment circuits, and wherein the digital signal processing circuit of the digital circuit initiates the program stored in the memory and generates the offset control signal in response to a signal, which indicates a termination of the plurality of offset adjustment operations of the plurality of adjustment circuits, generated by the sequencer.

7. The semiconductor integrated circuit according to claim 6,
wherein the analog circuit and the digital circuit are formed on a semiconductor substrate.

* * * * *